Sept. 24, 1940.  L. LOGAN  2,215,554
CORN SHOCKING ATTACHMENT FOR TRACTORS AND THE LIKE
Filed April 5, 1939  4 Sheets-Sheet 1

Lloyd Logan INVENTOR.

BY *CA Snowles*

ATTORNEYS.

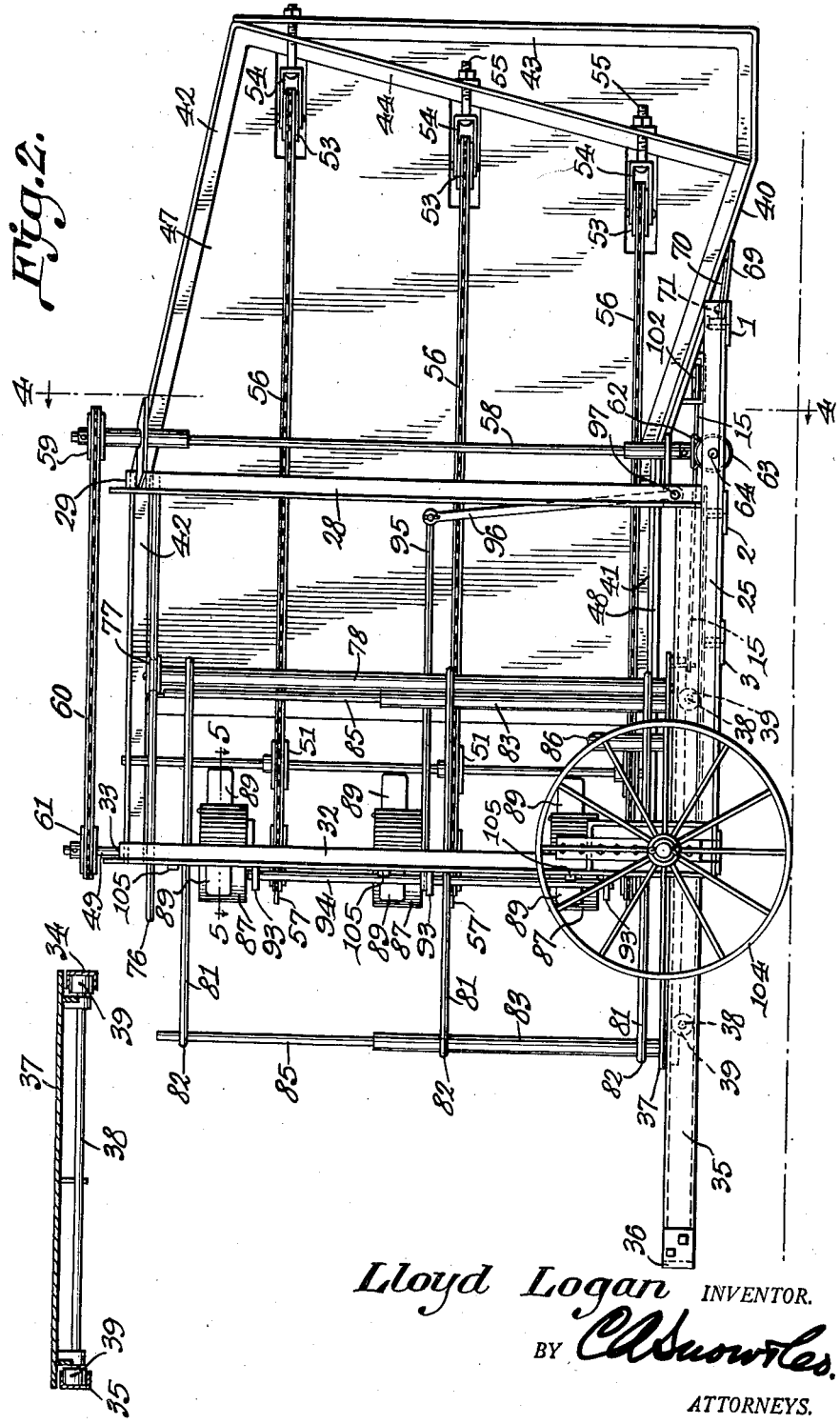

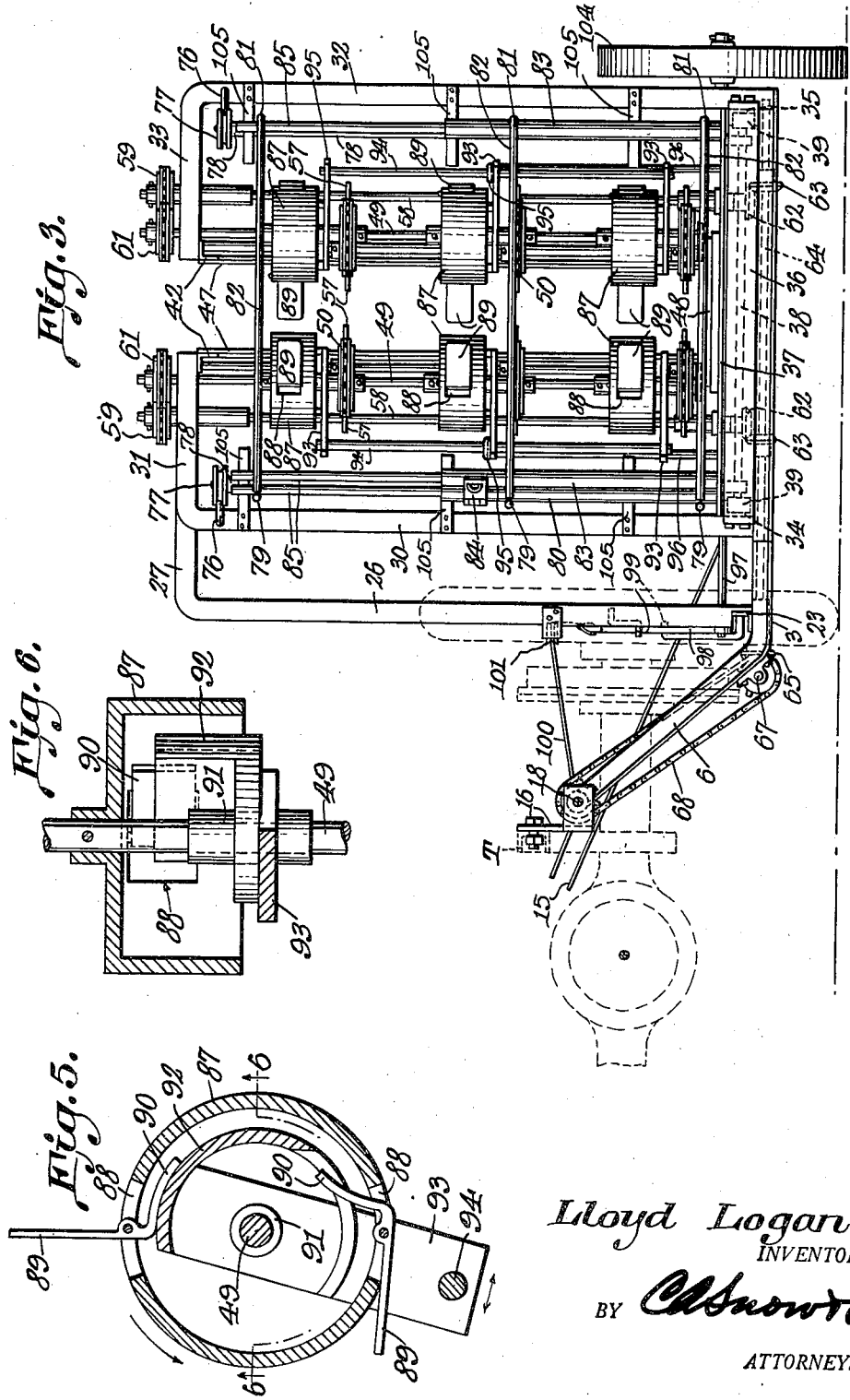

Sept. 24, 1940.  L. LOGAN  2,215,554
CORN SHOCKING ATTACHMENT FOR TRACTORS AND THE LIKE
Filed April 5, 1939  4 Sheets-Sheet 4
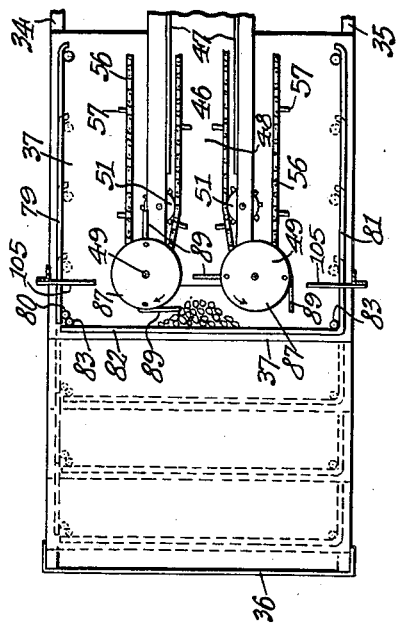
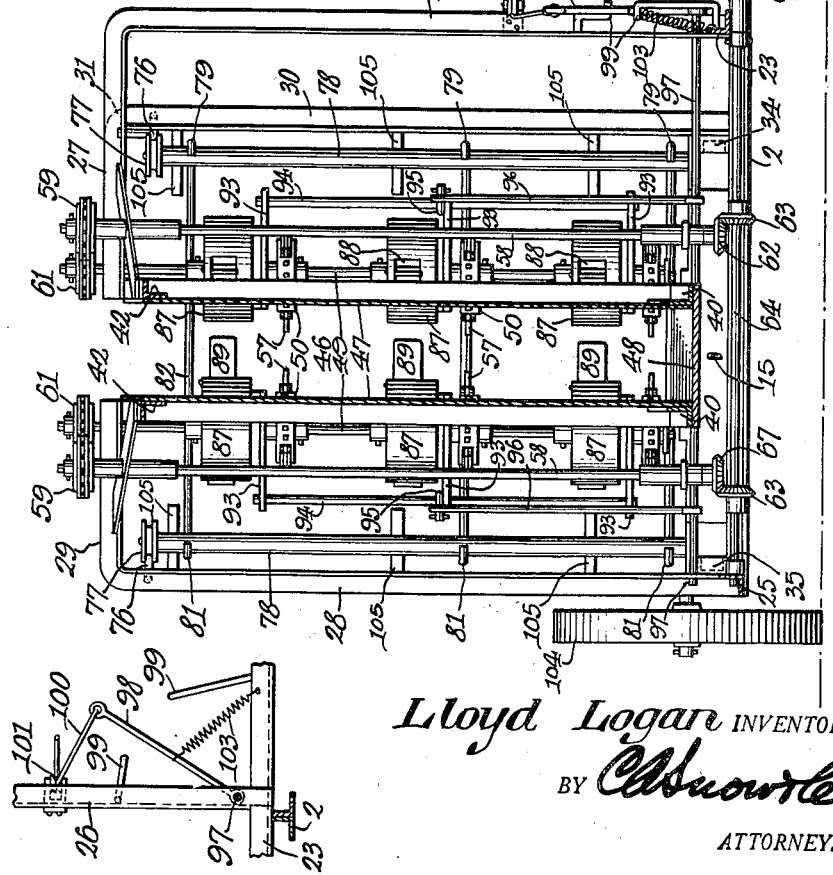
Lloyd Logan INVENTOR.
BY C. A. Knowles.
ATTORNEYS.

Patented Sept. 24, 1940

2,215,554

UNITED STATES PATENT OFFICE 2,215,554

CORN SHOCKING ATTACHMENT FOR TRACTORS AND THE LIKE

Lloyd Logan, Columbus Grove, Ohio

Application April 5, 1939, Serial No. 266,173

17 Claims. (Cl. 56—15)

This invention relates to an apparatus designed for attachment to and actuation by a tractor whereby rows of corn standing in a field can be cut, gathered in a compact mass for tying, and subsequently released for removal as a completed shock.

A further object is to provide a structure of this character utilizing an expansible cage to which the cut stalks are fed until a sufficient number have been gathered to produce a shock of the desired proportions.

A still further object is to provide simple but efficient means for feeding the cut stalks into the cage and for packing them therein.

Another object is to provide means under the control of an operator for regulating the expansion of the cage.

A still further object is to provide a means for controlling the packing mechanism whereby the cut stalks, as they are fed into the cage, can be moved in any desired direction within the cage so as to insure proper placement of the stalks during the packing operation.

Another object is to provide mechanism of this character which can be connected readily to a tractor so as to extend beyond one side thereof, means being employed for coupling the mechanism to the power shaft of the tractor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 2 is a side elevation of the apparatus.

Figure 3 is a rear elevation.

Figure 4 is a section on line 4—4, Figure 2.

Figure 5 is a horizontal section through one of the packing elements taken on the line 5—5, Figure 2, said section being enlarged.

Figure 6 is a section on line 6—6, Figure 5.

Figure 7 is a vertical transverse section through the floor of the cage and its supporting rail.

Figure 8 is an enlarged horizontal section through one of the hinge connections between the attachment and its drive shaft.

Figure 9 is a plan view on a reduced scale and more or less in diagram showing several positions of the movable part of the cage during the expansion thereof while cut material is being packed therein, these different positions being indicated by full and broken lines respectively.

Figure 10 is a detail view of a portion of the adjusting mechanism of the packers.

Figure 1:
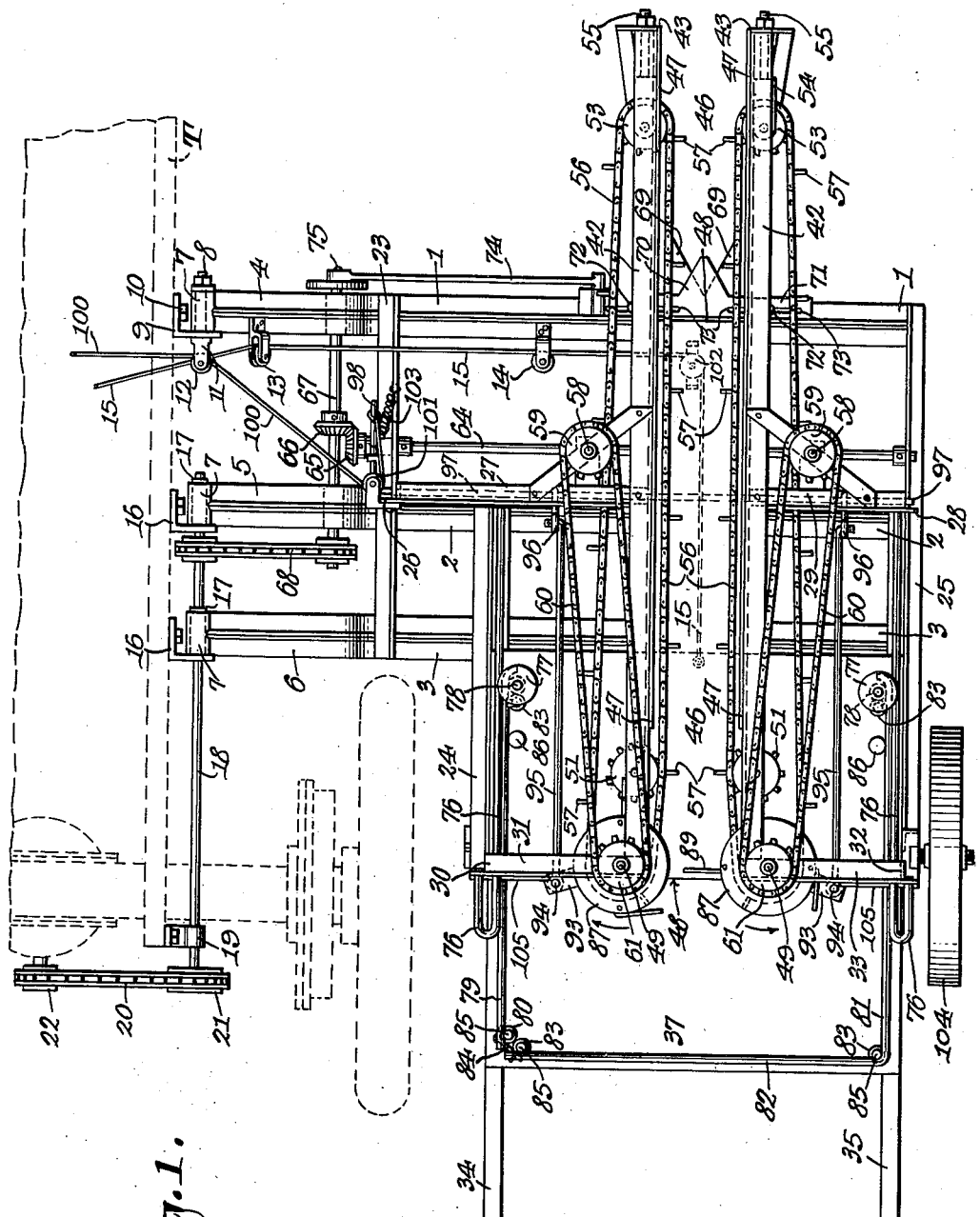
Figure 1 is a plan view of the shocking attachment, a portion of the tractor to which it is connected being indicated by broken lines.

Referring to the figures by characters of reference, 1, 2 and 3 designate parallel cross-beams each of which is provided, at one end, with an upwardly inclined extension 4, 5 and 6 respectively and the extensions have terminal sleeves 7 which aline. Sleeve 7 is mounted on a pivot bolt 8 extending from a bracket 9 which is adapted to be secured by a bolt 10 or the like to one side of a tractor frame T while extending from this bracket and in line with the bolt is a bearing 11 carrying a pulley 12. Other pulleys 13 and 14 are connected to extension 4 and beam 1 as shown and are for the purpose of guiding a restraining cable 15 adapted to extend to a point within convenient reach of the operator on the tractor T and which cable is provided for the purpose hereinafter pointed out.

Brackets 16 are adapted to be fastened to the side of the frame of tractor T and each of them has a tubular bearing member 17 extending backwardly therefrom. These members 17 constitute bearings for the sleeves 7 which are free to rotate thereon. Bearing members 17 also receive a drive shaft 18 extending along the side of the frame of tractor T and mounted in one or more supplemental bearings 19 carried by the tractor frame. This shaft is adapted to be driven by any suitable mechanism from the motor of the tractor, some of this mechanism being shown in Figure 1 where a chain and sprockets 20, 21 and 22 respectively are illustrated.

The beams 1, 2 and 3 are connected adjacent to their extensions by a beam 23 and another beam 24 connects beams 2 and 3 and extends rearwardly therebeyond to a point directly opposite the rear end of an outer side beam 25 which connects the beams 1, 2 and 3 and projects rearwardly therebeyond.

Extending upwardly from beam 23 directly over beam 2 is a standard 26 having a laterally extended arm 27 at its upper end. Another standard 28 is secured to the outer side beam 25 directly over beam 2 and is provided at its upper end with a laterally extended arm 29, the arms 27 and 29 being alined and extended toward each other but spaced apart at their inner ends as shown particularly in Figure 4.

Upstanding from the rear end of the inner side beam 24 is a standard 30 having a laterally extended arm 31 at its upper end and another standard 32 is mounted on the rear end of the outer side beam 25 and has a laterally extended arm 33 alined with and extended toward the arm 31. However these two arms are spaced apart at their inner ends as shown particularly in Figures 1 and 3.

Secured to the inner sides of the beams 24 and 25 are track members 34 and 35 the inner sides of which are channelled. These track members are extended rearwardly well beyond the beams to which they are secured and their rear ends are preferably connected by a cross-strip 36. A platform 37 overlies the track rails 34 and 35 and joined to the bottom of this platform are transverse shafts 38 each of which has rollers 39 at the ends thereof adapted to travel within the track rails.

Secured on the beam 1 are the forwardly and downwardly inclined front end portions 40 of bottom frame members 41 which extend rearwardly over and are supported by beam 2 and thence extend rearwardly over but out of contact with the platform 37. Upper frame members 42 connect the arms 27 and 29 to the arms 31 and 33 respectively and these upper frame members extend forwardly beyond standards 28 and are joined to the lower frame members 40 by means of front frame members 43 and braces 44. The upper frame members are spaced apart and the same is true of the lower frame members so that a passageway 46 is thus provided between them and this passageway has walls 47 formed of sheet metal attached to the upper and lower frame members and to the front and brace members 43 and 44. A floor 48 is located between the walls 47 at the bottom thereof and extends backwardly from above beam 1 to a point between the standards 30 and 32, the rear portion of this floor overlying and being out of contact with the platform 37. Thus it will be noted, as shown particularly in Figure 1, that the walls 47 and the frames on which they are mounted, are extended forwardly beyond the floor and beam 1.

The rear ends of the lower frame members 41 provide bearings for the lower ends of vertical shafts 49 each of which carries superposed sprockets 50. Additional sprockets 51 are carried by vertical shafts journalled in the upper and lower frame members close to the rear ends of the walls 47. These sprockets 51 are in line with the sprockets 50 and also in line with additional sprockets 53 carried by yokes 54 which are adjustably connected to the brace beams 44 by means of bolts 55. Endless chains 56 disposed in superposed relation are carried by the sprockets and each chain has one flight extending between the walls 47 while its other flight extends along the outer side of the wall. Each of these chains has laterally extended fingers 57 adapted to extend toward each other from those flights which are located between the walls 47 and said flights are adapted to move rearwardly as the apparatus is moved forwardly, the rearward movement of the flight being at the same speed as the forward movement of the apparatus.

Actuation of the chains is effected by upright shafts 58 journalled in bearings carried by the upper and lower frame members 42 and 41 at points outside of the passage 46. Each of these shafts has a sprocket 59 adapted to transmit motion through a chain 60 to a sprocket 61 on one of the shafts 49.

Both of the shafts 58 are provided at their lower ends with gears 62 meshing respectively with opposed gears 63 carried by a transverse shaft 64 which is extended under the floor 48 and is journalled in suitable bearings carried by the beams 23 and 25. Another gear is secured to shaft 64 at the inner end thereof and as shown at 65 and is adapted to receive motion through a gear 66 from a counter-shaft 67 which is journalled in bearings carried by the extensions 4 and 5 and, in turn, receives motion through chain and sprocket mechanism 68 from the shaft 18.

By arranging the gears as shown the two shafts 58 will be rotated in opposite directions respectively and the shafts 49 will be similarly rotated, the direction of rotation being indicated by arrows in Figure 1.

Located in front of and substantially in line with the floor 48 are stationary cutting blades 69 with which cooperates a movable cutter 70 carried by a cutter bar 71 mounted for reciprocation transversely of the passage 46 and in front of the floor 48. Bar 71 can be guided in any suitable manner, as by means of bolts 72 in slots 73 in the cutter bar 71 and motion may be transmitted to the cutter bar by a pitman 74 pivotally connected at one end to the cutter bar and at its other end to a crank 75 secured to and rotatable with shaft 67.

Parallel rails 76 are provided between the standards of this structure, one of these rails connecting arm 27 to standard 30 while the other rail connects the upper portions of the standards 28 and 32. These rails constitute guides for wheels 77 carried by the upper ends of posts 78 upstanding from the platform 37 adjacent to its forward corners. One of these posts is mounted for rotation and has rearwardly extending cage bars 79 joined at their rear ends and at one or more intermediate points by tubular uprights 80. Cage bars 81 are also secured to the other rotatable post 78 and extend rearwardly therefrom, these cage bars being provided at their rear ends with laterally projecting extensions 82, both the bars 81 and their extensions 82 being connected at desired points by tubular uprights 83. Any suitable means, such as a hasp 84 or the like can be used for securing together the tubular uprights 80 and 83 carried by the free ends of bars 79 and extensions 82 and when the parts are thus joined, they cooperate to form a substantially rectangular cage the front of which opens into the passage 46. If desired the height of this cage can be increased by mounting rods 85 so as to telescope within the tubular uprights 80 and 83, these rods being connected by cage bars 79, 81 and 82 similar to those connected to the tubular uprights. Thus by pulling the rods upwardly or sliding them downwardly the height of the cage can be increased or reduced.

As the cage bars are mounted to swing laterally when not fastened by means of the hasp or other device indicated at 84, it is essential that some means be provided for holding them against relative swinging movement toward each other when they are in normal or closed position. For this purpose stops 86 are mounted on the platform 37 at points where they will be engaged by some of the cage bars.

Secured to each of the shafts 49 so as to rotate therewith are superposed drums 87 each of which has diametrically opposed slots 88 extending partly therearound and in each of the slots is pivotally mounted a blade 89 provided, at its inner end and within the drum, with a laterally extended wing 90.

Journalled on each shaft 49 within each of the drums 87 is a sleeve 91 and each sleeve carries a segmental cam 92 having a radial arm 93 secured thereto. The arcuate portion of the cam is concentric with the drum and constitutes a track for the wings 90 within said drum. The arms 93 extending from the cams on one shaft are joined by a connecting rod 94 so that they can be moved in unison and each connecting rod is joined by a rod 95 to an arm 96 secured to and extending upwardly from a rock shaft 97 and secured to and movable with one end of the rock shaft is a crank arm 98 adapted to swing between stops 99. This crank arm has an actuating cable 100 attached to it and extended over guide pulleys 101 and 12 to a point where it can be reached and operated readily by an occupant of the tractor T.

The cable 15 heretofore referred to is extended under the front portion of the floor 48 where it is guided rearwardly by a pulley 102 secured to the undersurface of the floor. From this pulley the cable is extended rearwardly and attached to the forward portion of the platform 37.

It is to be understood that the drums 87 all rotate with the shaft 49 but that the cams 92 and their sleeves 91 rotate on the shaft when they are shifted by the arms 93. As the drums 87 rotate in the directions indicated by the arrows, the wings 90 carried by the blades 89 will successively wipe along the arcuate outer surfaces of the cams 92 and as long as these wings are in contact with the cams the blades 89 will be held extended substantially radially beyond the drums. However, when the wings move off of the arcuate surfaces of the cams, the blades will be free to fold inwardly against the drums as will be noted for example by referring to Figure 5.

The cams 92 on one shaft are disposed oppositely to the cams 92 on the other shaft and these cams are normally so located that as the two shafts 49 and their cams rotate in the directions indicated by the arrows, the blades 89 will extend toward each other as they move backwardly within the back portion of the passage 46. Thereafter, however, these blades will be released so as to fold back upon the cams and retain this position until the inner portions or wings of the blades come into contact with the cams 92 whereupon they will be swung so as to move the blades 89 outwardly and maintain them in outwardly extended positions until the wings again pass off of the cams.

By adjusting the cams 92 angularly, the cams on one shaft 49 being movable oppositely to the cams on the other shaft 49, it will be apparent that the points at which the blades 89 will fold against the drums can be varied. If the cams are adjusted in the direction in which the drums are being rotated the points of folding of the blades will be nearer the sides of the machine than would be the case should the cams be adjusted oppositely to the direction of rotation of the drums. Thus the blades can be caused to feed material from the outlet or rear end of passage 46 either straight back from said outlet or along rearwardly diverging lines. The adjustment of the cams is effected at will simply by shifting the rock shaft 97 through a pull in one direction on lever 98. A spring 103 can be used for returning lever 98 and the parts controlled thereby to their initial positions when the cable 100 is paid out.

When it is desired to use the mechanism herein described the same is coupled to one side of a tractor so that motion can be transmitted from the motor of the tractor to shaft 18 and thence to counter-shaft 67 and transverse shaft 64. This shaft, in turn, will drive the drum-carrying shafts 49 in the direction indicated by the arrows in Figure 1 and will also move the inner flights of the drag chains 56 rearwardly within the passage 46. As before stated the drag chains move at the same speed rearwardly that the apparatus is moving forwardly. The cage platform 37 is pulled forwardly by means of cable 15 so that the laterally extending arms 82 of cage bars 81 will be supported close to the paths of the blades 89, as shown by full lines in Figure 9. The bars of the cage are fastened together by the fastener 84 so that the cage cannot open and with the parts thus assembled the apparatus is ready for use.

As the tractor moves forwardly the shocking mechanism which is supported at the outer side by a ground wheel 104 is moved forwardly so that a row of standing corn will be received within the advancing end of the passage 46. As the blades 69 and 70 reach the stalks they operate to sever the same whereupon the stalks, which have already been engaged by the fingers 57 on the chains 56, will be supported in upright positions as they are conveyed rearwardly on end along the floor 48 of passage 46. As the standing stalks reach the rear portion of the passage they are engaged by the projecting blades 89 which, moving in the direction indicated by the arrows in Figure 1, will push the stalks backwardly onto the platform 37 of the cage and against the laterally extending arms 83 of the side bars 82. After thrusting the stalks into the cage these blades will feather or fold against the drums as they move out of the cage and forwardly. Just prior to entering the passage the blades will be swung outwardly as a result of the engagement of wings 90 with the cams 92 and the blades, in these outwardly extended positions, will then move back of the stalks in the paths thereof and thrust them rearwardly onto platform 37 as already explained. This operation is continued as long as desired and can result in distributing the stalks so that some of them will be fed laterally within the cage so as to fill it. This result is obtained by shifting lever 98 backwardly out of normal position and against the action of spring 103 so that the positions of the cams 92 will be changed and the blades 89 will travel rearwardly and laterally greater distances before folding. Following distribution of stalks within the cage the cable 15 is paid out by the operator so as to permit the cage to be pushed backwardly a short distance while additional stalks are being thrust thereinto. The cage is then held under restraint until it again has been filled after which it is again released so as to move backwardly a short distance. Following this step by step release and filling of the cage, as indicated in Figure 9, the cage ultimately will reach the rear limit of its movement and after the cage, in this position, has been completely filled with standing stalks, the operation of the packing mechanism is stopped. The collected stalks are then tied to form a shock and thereafter the arms 83 are unfastened from the rods 79 and as all of the rods are at this time located between or slightly back of the rear standards 30 and 32, the bars at the two sides of the cage are free to swing apart so as to release the formed shock and permit it to be lifted by any sutiable means from platform 37 and deposited on the ground at a point back of the tractor. Following this operation the bars of the cage are swung against the stops 86, extensions 83 are fastened to the adjacent side bars 80, platform 37 is pulled forwardly by means of its cable 15, and the parts are thus reset to repeat the operation already described as the machine is advanced along the row.

For the purpose of preventing stalks from tilting forwardly from the cage between the sides thereof and the connecting rods 94, guard fingers 105 may be extended toward each other from the standards 30 and 32 without crossing the paths of the rods 94.

It is to be understood of course that the framework of this machine can be changed to meet varying conditions and to adapt the apparatus for attachment to different types of tractors. It is also to be understood that the mechanism can be made of any suitable size and materials. Importance is attached to the fact that the mechanism, when properly placed at one side of the tractor, can be under constant observation by the operator on the tractor and as he can observe at all times the amount of material in the cage, he can release the cage for backward movement as needed. He can also readily adjust the packers so as to move the stalks in the proper direction within the cage and prevent them from piling up by being thrust in one direction only.

What is claimed is:

1. A shocking machine including means for receiving and selecting cut stalks, said means having an inlet, a packer rotatable adjacent to the inlet and including pivoted stalk pushing blades movable into and out of the inlet path and means cooperating with said blades for holding them in outstanding stalk pushing positions while moving toward the inlet and for releasing them for free swinging movement during a portion of the rotation of the packer, said means including an angularly adjustable cam having an arcuate bearing surface, and means carried by the blades for moving into and out of contact with the cam.

2. A shocking machine including a cage for receiving and accumulating cut stalks, said cage having an inlet, and means adjacent to the inlet for pushing cut stalks through the inlet and into the cage, said means including pivotally supported blades mounted for movement about a common axis, angularly adjustable cams, and means carried by the blades for wiping engagement with the cams, said means and cams cooperating to hold the blades against pivotal movement while moving toward the inlet and for releasing the blades for free swinging movement during a portion of their rotation.

3. A shocking machine including a cage having an inlet, and means adjacent to the inlet for pushing cut stalks into the cage, said means including superposed drums mounted for simultaneous rotation in one direction, blades pivotally connected to and extending outwardly from the drums, and cooperating means on the blades and within the drums for holding the blades against pivotal movement during a portion of the rotation of the drums and for releasing the blades for free pivotal movement during the remainder of the rotation of the drums, said means including a cam within each drum mounted for angular adjustment, and a wing on each blade positioned for intermittent wiping engagement with the cam.

4. A shocking machine including a cage having an inlet, means for feeding cut stalks toward the inlet and means for transferring the stalks from the feeding means through the inlet to the cage, said means including blades mounted to swing about individual axis, means for rotating the blades about a common axis, a wing on each blade, and angularly adjustable means in the paths of the wings for successively holding the blades against movement about their individual pivot and releasing them for free pivotal movement during each rotation of the blades about their common axis.

5. In a shocking machine a cage mounted for sliding movement and having an inlet, means for feeding cut stalks toward the inlet, and means for transferring the stalks from the feeding means through the inlet into the cage and for thrusting through the transferred stalks against the cage to slide the cage.

6. In a shocking machine a cage mounted for sliding movement and having an inlet, means for feeding cut stalks toward the inlet, and means at the inlet for engaging the stalks and transferring them from the feeding means to the cage, thereby to pack the stalks in the cage, said cage being slidable under pressure of the stalks being packed therein.

7. In a shocking machine a cage mounted for sliding movement and having an inlet, means for feeding cut stalks toward the inlet, and means at the inlet for engaging the stalks and transferring them from the feeding means to the cage, thereby to pack the stalks in the cage, said cage being slidable under pressure of the stalks being packed therein, and means for restraining the cage against sliding movement.

8. In a shocking machine a cage mounted for sliding movement and having an inlet, means for feeding cut stalks toward the inlet, and means at the inlet for engaging the stalks and transferring them from the feeding means to the cage, thereby to pack the stalks in the cage, said cage being slidable under pressure of the stalks being packed therein, and means under the control of an operator for controlling the sliding movement of the cage under the pressure of the stalks.

9. In a shocking machine a cage mounted for sliding movement, means for feeding cut stalks thereto, said cage having an inlet, packing means for transferring stalks from the feeding means through the inlet and into the cage, and means under the control of an operator for adjusting the packing means to press the stalks in predetermined directions within the cage.

10. In a shocking machine a cage mounted for sliding movement, means for feeding cut stalks thereto, said cage having an inlet, packing means for transferring stalks from the feeding means through the inlet and into the cage, and means operating independently of the packing means and under the control of an operator for determining the direction of movement of the stalks in the cage under the action of the packing means.

11. A shocking machine including a frame having a passage for standing cut stalks, stalk cutting means at one end of the passage, a cage at the other end of the passage having an inlet for receiving cut stalks, means for feeding cut stalks along the passage to the inlet, and rotatable means adjacent to the inlet for forcibly directing cut stalks from the feeding means through the inlet and into the cage, said means including blades mounted for rotation about a common axis and means cooperating with the blades for holding them in stalk thrusting positions while moving toward the inlet and for releasing them for disengagement from the stalks while moving in another direction.

12. A shocking machine including a wheel-supported structure, means including a drive shaft for hingedly connecting said structure to the side of a tractor, said structure including a stalk-receiving passage, stalk cutting means at one end of the passage, a slidable cage at the other end of the passage having an inlet for receiving cut stalks from the passage, means driven by the shaft for feeding cut stalks along the passage and toward the inlet, and means driven by said shaft for transferring the stalks from the feeding means to the cage through the inlet.

13. A shocking machine including a wheel-supported structure, means including a drive shaft for hingedly connecting said structure to the side of a tractor, said structure including a stalk-receiving passage, stalk cutting means at one end of the passage, a slidable cage at the other end of the passage having an inlet for receiving cut stalks from the passage, means driven by the shaft for feeding cut stalks along the passage and toward the inlet, and means for thrusting stalks from the feeding means through the inlet and into the cage and thereafter withdrawing from the stalks, said means including a segmental cam, feathering blades movable relative to the cam, and arms carried by the blades and positioned for intermittent wiping engagement with the cam during movement of the blades relative to the cam.

14. In a shocking machine the combination with a slidable platform and hingedly mounted bars cooperating with the platform to form a cage, said cage having an inlet, of means for feeding cut stalks toward the inlet, means for transferring the cut stalks from the feeding means through the inlet into the cage, and means for detachably securing the bars against relative swinging movement to receive thrust from the stalks and move the platform.

15. In a shocking machine a cage including a slidable platform and movably mounted sides and end, said cage having an inlet opposite to said end, means for feeding cut stalks toward the inlet, means for transferring the cut stalks from the feeding means through the inlet and against the end of the cage to move the cage, and means for holding the cage under restraint.

16. In a shocking machine a cage, closed at the sides and one end and having an inlet at its other end, said cage being slidably mounted, means for feeding cut stalks toward the inlet, rotatable members adjacent to the inlet for engaging cut stalks to transfer them from the feeding means through the inlet and into the cage, and means under the control of an operator and operable independently of the transferring means for maintaining said members intermittently in stalk-transferring position and for changing the direction of movement of the stalks while being transferred into the cage.

17. A shocking machine including a cage mounted for sliding movement, means for restraining the movement of the cage, said cage having an inlet, opposed shafts adjacent to the inlet, a plurality of packing blades rotatable with each of the shafts, each of said blades being mounted for independent swinging movement about an individual axis parallel with said axis of rotation, and cooperating means on the shafts and blades for holding the blades against movement about their individual pivots during a portion of each rotation of each shaft and for releasing the blades for free pivotal movement during the remaining portion of said rotation, said means including cams angularly adjustable upon the shafts, means connecting the cams on each shaft for simultaneous adjustment, and means on the blades of each shaft for intermittent wiping contact with the respective cams on said shafts.

LLOYD LOGAN.